(12) United States Patent
Roa-Espinosa et al.

(10) Patent No.: US 10,532,942 B1
(45) Date of Patent: Jan. 14, 2020

(54) WATER SEPARATION FROM PARTICULATE MATERIALS

(71) Applicants: Aicardo Roa-Espinosa, Madison, WI (US); Kim Huong Pham, Belleville, WI (US)

(72) Inventors: Aicardo Roa-Espinosa, Madison, WI (US); Kim Huong Pham, Belleville, WI (US)

(*) Notice: Subject to any disclaimer, the term of this patent is extended or adjusted under 35 U.S.C. 154(b) by 0 days.

(21) Appl. No.: 16/512,126

(22) Filed: Jul. 15, 2019

Related U.S. Application Data

(63) Continuation-in-part of application No. 16/181,116, filed on Nov. 5, 2018, now abandoned.

(51) Int. Cl.

| | | |
|---|---|---|
| *C02F 11/147* | (2019.01) | |
| *C02F 1/52* | (2006.01) | |
| *C02F 1/56* | (2006.01) | |
| *C02F 11/00* | (2006.01) | |
| *B01D 21/01* | (2006.01) | |
| *E21B 21/06* | (2006.01) | |
| *C02F 1/28* | (2006.01) | |
| *C02F 11/14* | (2019.01) | |
| *C02F 103/10* | (2006.01) | |

(52) U.S. Cl.
CPC .......... *C02F 11/147* (2019.01); *C02F 1/5227* (2013.01); *C02F 1/56* (2013.01); *C02F 11/008* (2013.01); *B01D 21/01* (2013.01); *C02F 1/285* (2013.01); *C02F 11/14* (2013.01); *C02F 2103/10* (2013.01); *C02F 2305/00* (2013.01); *E21B 21/065* (2013.01)

(58) Field of Classification Search
None
See application file for complete search history.

(56) References Cited

U.S. PATENT DOCUMENTS

| | | | |
|---|---|---|---|
| 6,171,506 B1 * | 1/2001 | Allen ..................... | B01D 21/01 209/5 |
| 8,076,391 B2 * | 12/2011 | Roa-Espinosa ......... | C08K 3/34 252/180 |
| 9,249,039 B1 * | 2/2016 | Roa-Espinosa ......... | C02F 11/12 |
| 2009/0020458 A1 * | 1/2009 | Bozak ................ | B01D 17/0205 208/390 |
| 2011/0272362 A1 * | 11/2011 | Sikes ........................ | C02F 1/56 210/705 |

* cited by examiner

*Primary Examiner* — Clare M Perrin
(74) *Attorney, Agent, or Firm* — Steven H Greenfield; "Greenfield Invention and Patent Consulting, Inc."

(57) ABSTRACT

A process for removing water from particulate material slurries produced by horizontal drilling, vertical drilling and from dredging of bodies of water is disclosed. The process comprises a first step of water removal accomplished by diffusing a chemical reagent into the particulate material source stream that results in separating out a clean water fraction and a second step of reacting the sludge with a demulsifier and a superabsorbent polymer that locks onto the water in the remaining slurry thus turning the slurry into a solid crust. The crust is ground into a particulate form and disposed in a landfill. The combined effect of the treatments is the thickening of the particulate material slurry from about 10% solids to about 25% solids. The removed water may be used for further drilling and drinking. Another benefit is the reduced volume of the particulate material that needs to be disposed in landfills.

16 Claims, 6 Drawing Sheets

Flow in

Column with flow through baskets

Flow through basket

Flow through basket containing stacked pellets

Flow out

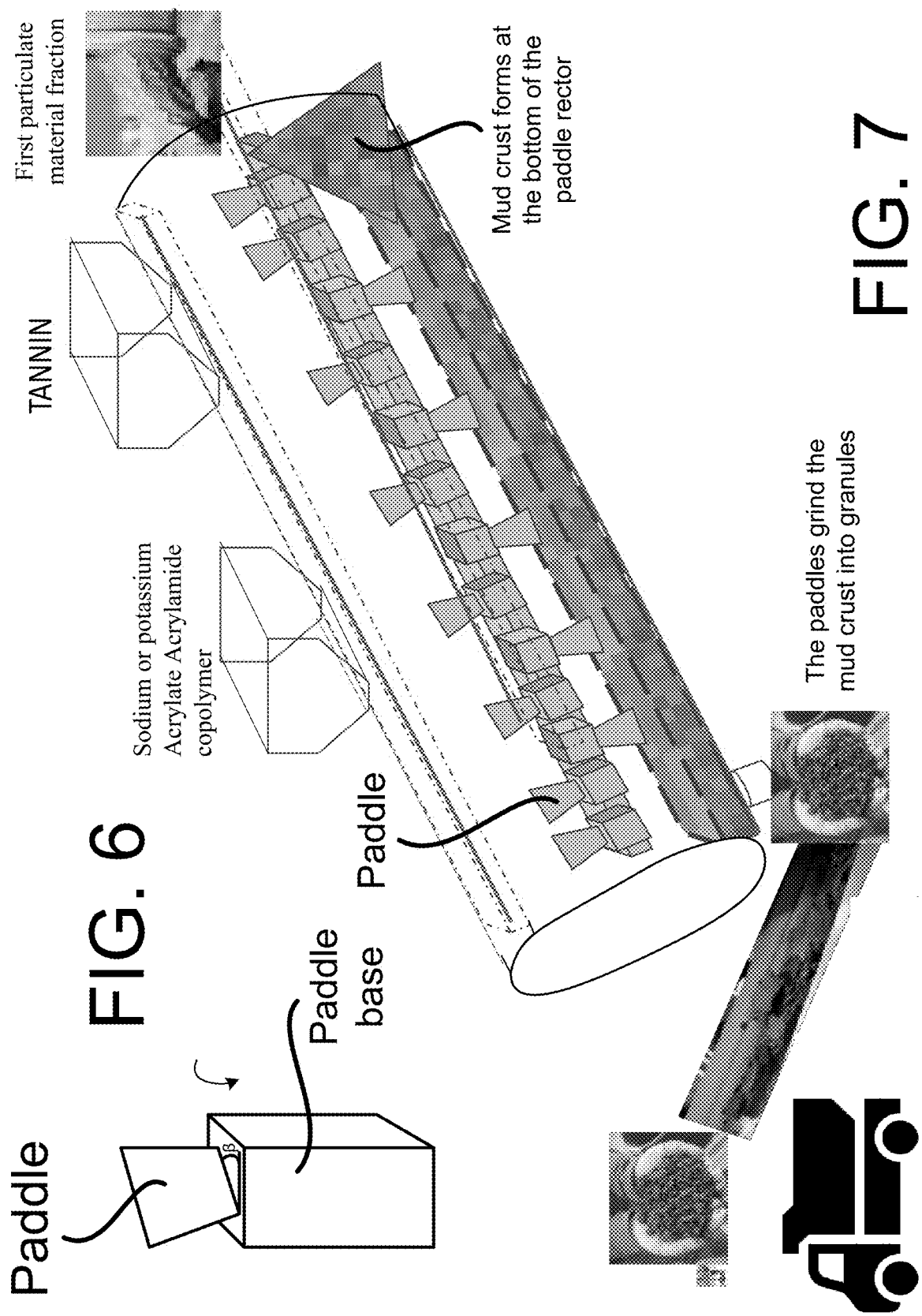

WATER SEPARATION FROM PARTICULATE MATERIALS

RELATED APPLICATIONS

This patent application is a continuation in part of U.S. application Ser. No. 16/181,116 filed on Nov. 5, 2018.

FIELD OF THE INVENTION

The present invention relates generally to the field of sludge treatment and more specifically to a process of separating water from particulate slurries resulting from drilling and excavation and from dredging of rivers, lakes and other bodies of water.

BACKGROUND OF THE INVENTION

Drilling and excavation is widely practiced for various purposes such as drilling for tunnels, mines and drilling shafts for oil and gas exploration. With new technologies enabling horizontal and vertical drilling deep into layers of earth strata, the drilling, which requires large amounts of water, often generates large volumes of excavated slurry of suspended solids that requires costly removal and disposal. This presents a logistic and environmental problem that is costly to solve.

The current practice of material handling depends on the type of hole being drilled (e.g., well, mine shaft, or tunnel), the site conditions and the size, orientation, and length of the hole. In general, materials must be transported from the bit face of drilling to the surface and from the surface to the land field for disposal. Material handling logistics limit the advance of hole-boring when materials cannot be transported to the surface as rapidly as they are mined or when they cannot be moved from the surface to a disposal area as rapidly as they are brought to the surface. Surface disposal problems often create environmental problems associated with toxic materials that maybe liquids or solids.

The amount of slurry created in the bit phase of tunneling is four times the quantity of slurry generated in the vertical drilling phase. In drilling, the materials may not fit in the annular space between the hole and the drill pipe. Modern tunnel excavation technologies use water in copious amounts to cool the excavation equipment.

The excavated solids from both vertical and horizontal usually contains suspended, silt, sand, cement, clay, and bentonite. These solids mixed with water are generally considered difficult to treat because of their high abrasiveness, viscosity and density and therefore the need to separate the water from the sludge. Concentrating the sludge makes it more feasible and less expensive to transport for disposal or recycle for further processing. The water removed from the excavated sludge may be reused for drilling or drinking.

SUMMARY OF THE PRESENT INVENTION

In an aspect of the present invention, a process for removing water from a mixture of water and particulate material, the process comprises:

providing a source stream containing a mixture of water and particulate material having a weight consistency of 5% to about 15%;

a first step of treating the source stream with a first chemical reagent composition, the first step being accomplished by diffusing the first chemical reagent composition into the source stream, the treating resulting in separating the source stream treated with the first chemical reagent composition into a first particulate material fraction and a first water fraction, the first particulate material fraction containing 70% to about 80% water;

a second step of transforming the first particulate material fraction from a substantially liquid form into a solid block form;

and a third step of transforming the solid block into granular form that may be transported to a landfill for disposal.

These and other features, aspects and advantages of the present invention will become better understood with reference to the following drawings, description and claims.

BRIEF DESCRIPTION OF THE DRAWINGS

FIGS. 5, 6 and 7 portray a reactor and reactor components used in the process for separating water from particulate materials according to an embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

The present invention comprises a process and compositions for removing water from a mix of excavated materials containing about 85-95% water by weight in two main steps: 1) a water removal step that reduces the water content of the excavated materials to about 70-80% and 2) a step of treating the excavated material with a demulsifying composition and a superabsorbent polymer that locks the water in the excavated material from step 1. The preferred demulsifying composition is cationic tannin. The second step turns the excavated material into a substantially solid crust that is ground into a particulate form that may be disposed in a landfill. The preferred superabsorbent formulations include anionic potassium acrylate acrylamide copolymer, anionic sodium acrylate acrylamide copolymer, anionic ammonium acrylate acrylamide copolymer and mixtures thereof. Alternatively, the second step may be accomplished by treating the excavated material with aluminum chlorohydrate followed by sodium, potassium or ammonium anionic acrylate acrylamide copolymer treatment. It is noted that water content of 85-95% by weight is equivalent to a 10-15% weight consistency in the context of the present invention.

The two step process of removing water and turning the resulting slurry into a solid form significantly reduces the volume of the excavated slurry and transforms it into a material suitable for transportation and disposal in a landfill.

The excavated material from vertical drilling is generally transported directly from the bore to the surface where it is stored in piles prior to transporting it away for disposal.

In horizontal drilling, tunnels large enough to contain workers and drilling equipment are dug underground in the vicinity of the piping that is laid for fracking. The excavated material from the horizontal drilling is generally stored in these tunnels before being transported by railcars or truck to the surface. The excavated materials come in a form of particles having a wide spectrum of sizes ranging from several microns to larger than 0.05 inches. Generally, particles larger than 0.05 inches need to be screened out and the treatments of the present invention are then applied only to particles smaller than about 0.05 inches in diameter.

Also within the scope of the present invention is treating particulate materials from dredging of lakes, rivers and other bodies of water. The storage of these materials presents a logistical issue and water removal would therefore be beneficial. For treating materials that are dredged from a lake or a river, the process would be set up in a location near the storage area of these materials.

Figure 1:
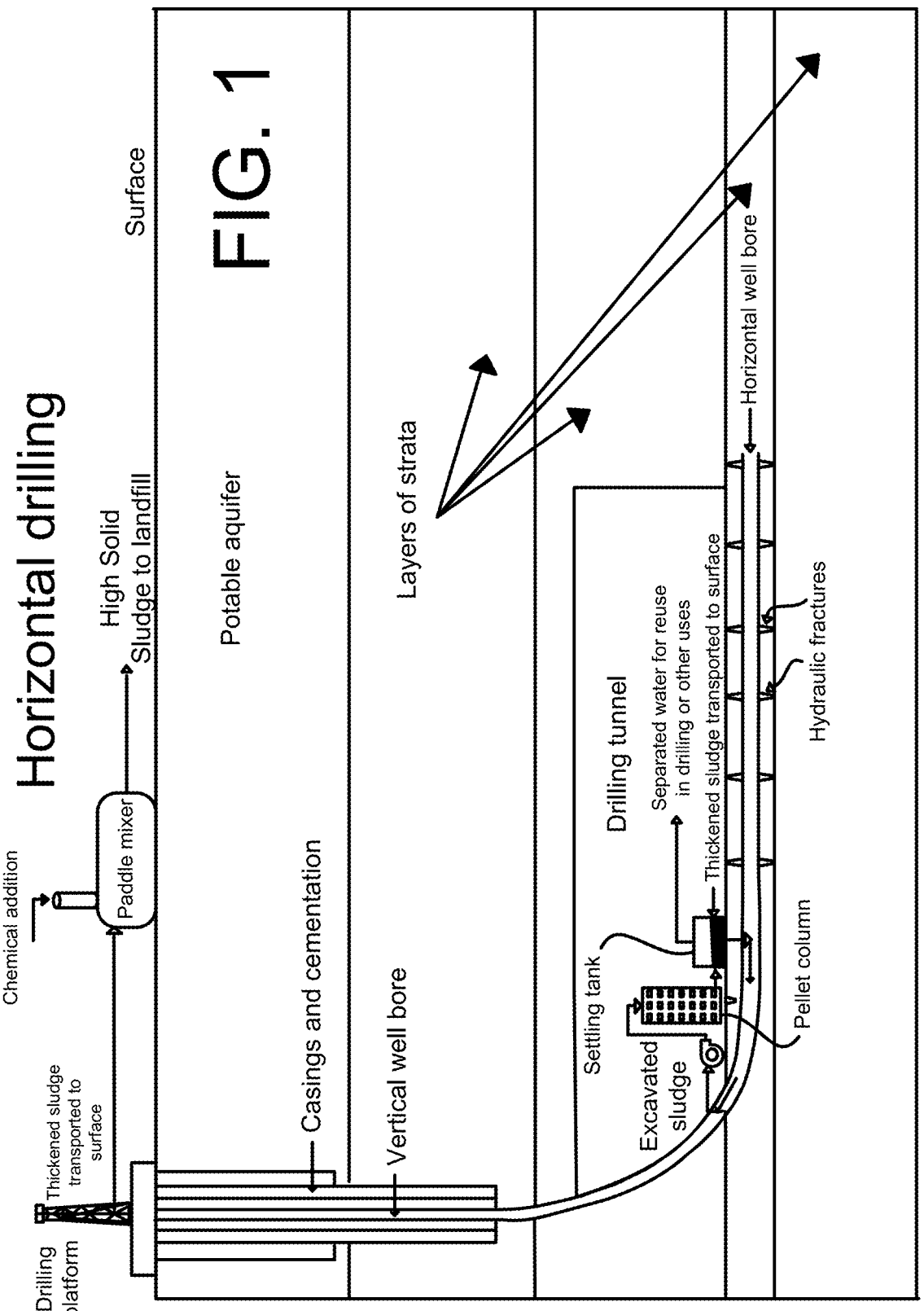
FIG. 1 presents an illustration of the process for separating water from particulate materials according to an embodiment of the present invention.
Figure 2:
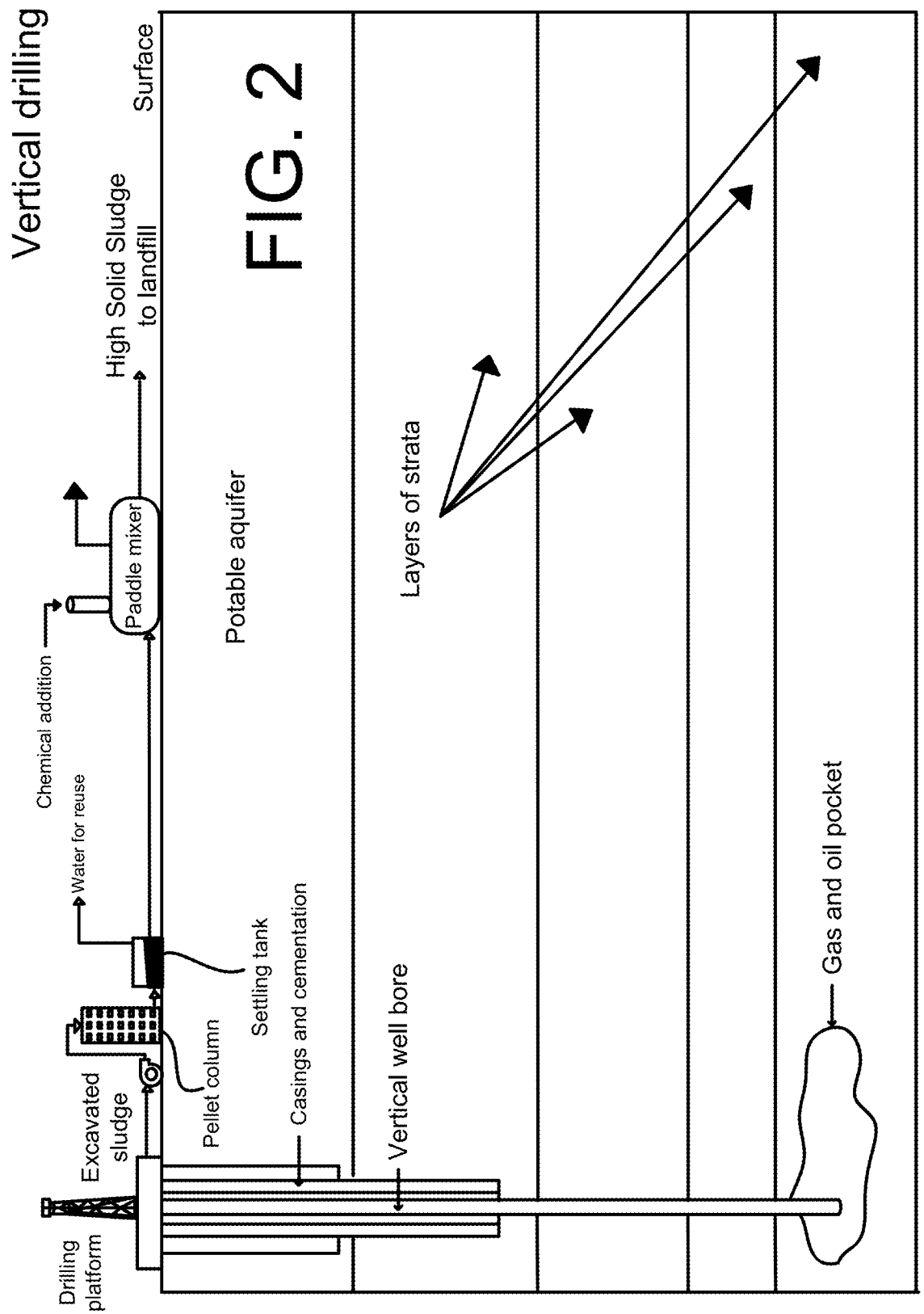
FIG. 2 shows a process for separating water from particulate materials according to another embodiment of the present invention.
Figure 3:
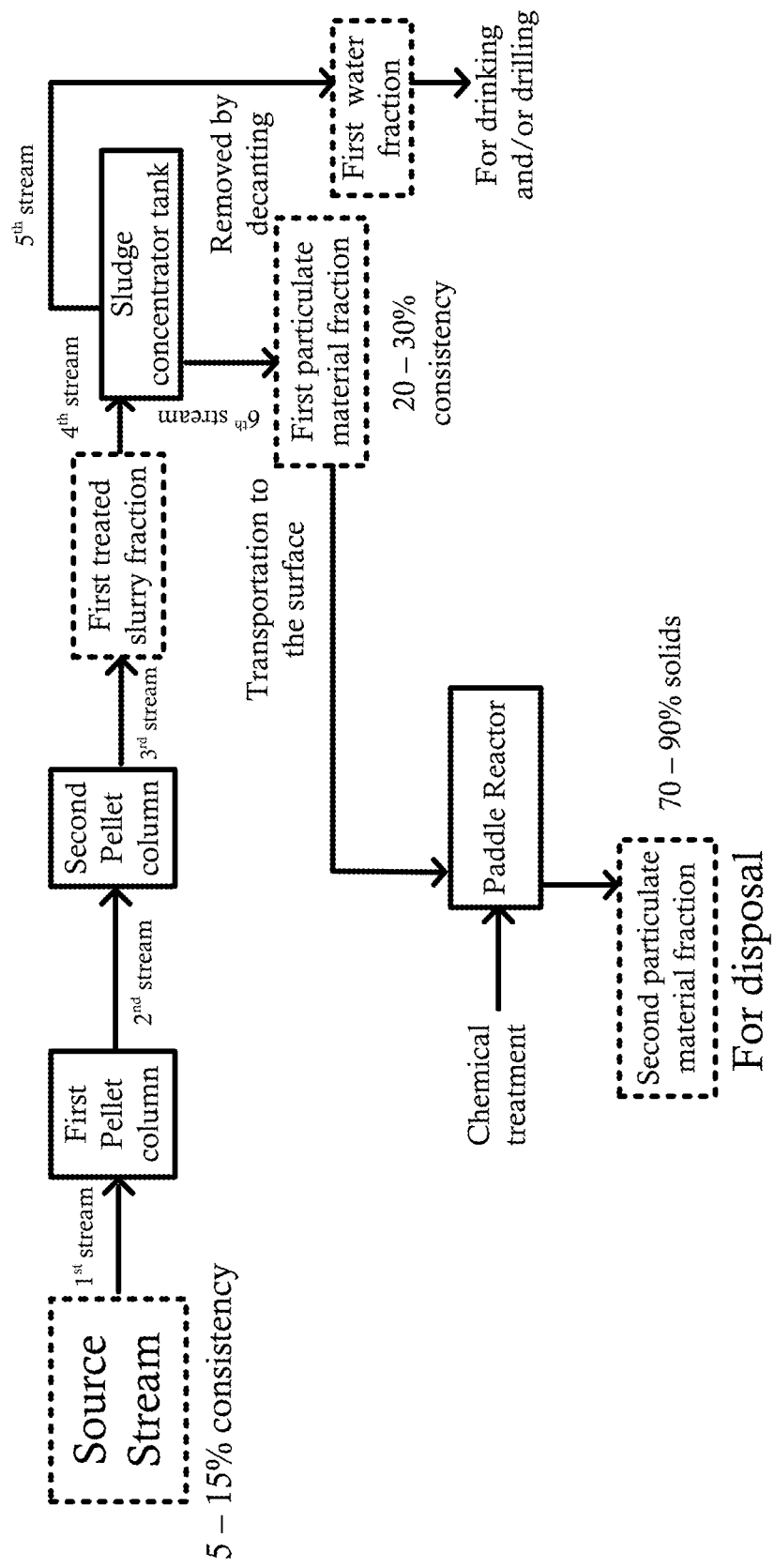
FIG. 3 is a schematic of a process for separating water from particulate materials according to an embodiment of the present invention.
Figure 4:
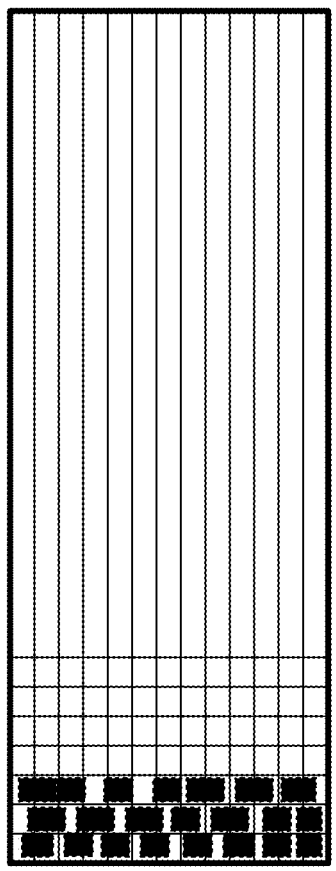
FIG. 4 is a depiction of an equipment component of the process for separating water from particulate materials according to an embodiment of the present invention.
Figure 5:
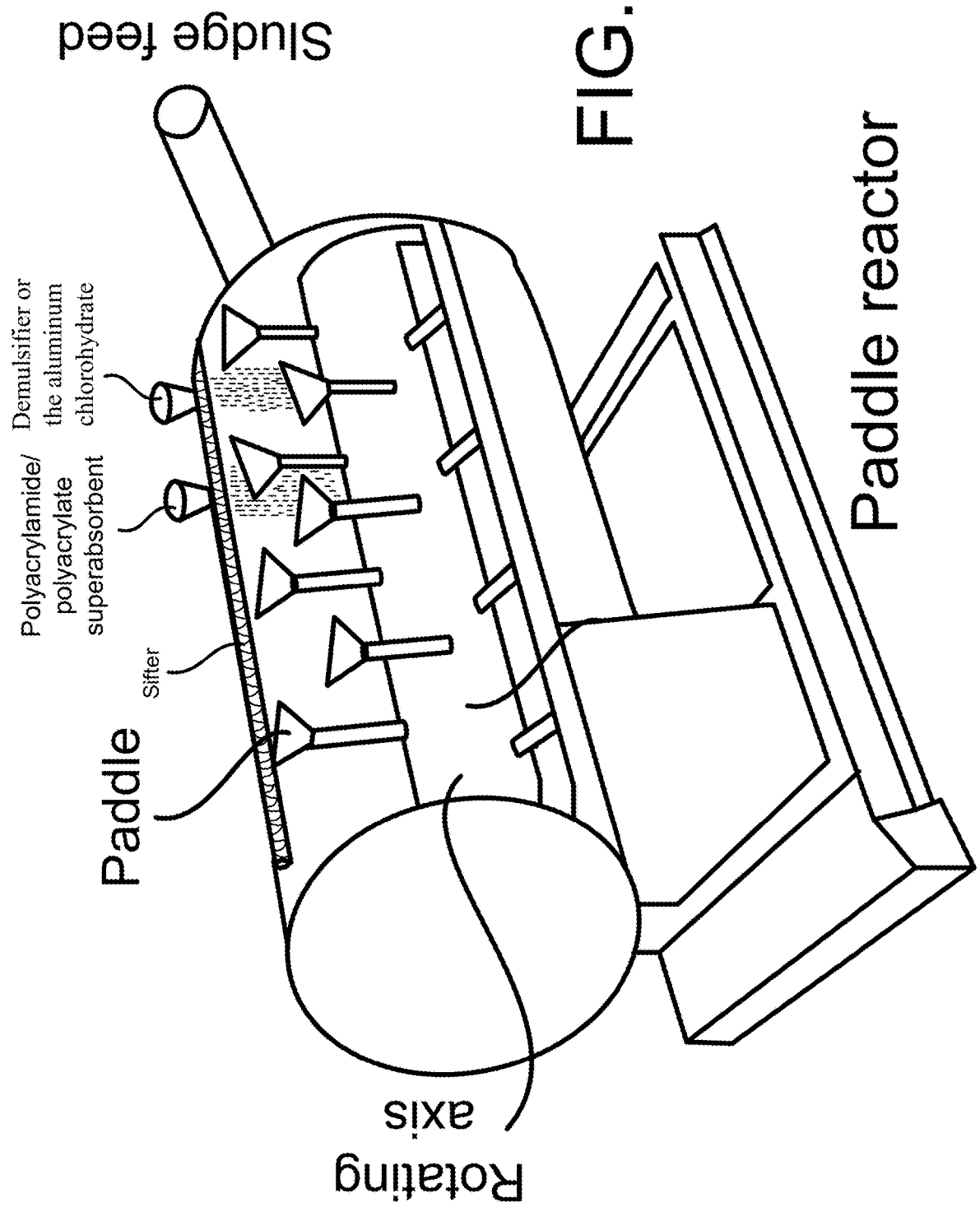

The various embodiments of the process are illustrated in FIGS. 1-7.

In the first step of the process, the source stream of the excavated or dredged material having solids in the range of about 5% and 15% is fed into a first column of flow-through baskets that contain a plurality of pellets stacked on top of each other in a way that allows the excavated or dredged material source stream to come in contact with a large surface area of the pellets. The composition of the pellets diffuses into the excavated material as it flows through the baskets containing the pellets. The pellets are stacked with sufficient space between the pellets to allow the material source stream to flow through the baskets and come in contact with the pellets. Generally, at least 30% of the volume of the stack of pellets is voided.

The composition diffuses into the source stream in an amount of about 0.1% to 0.5% by weight of the source stream. The presence of the composition in the source stream causes it to separate into a water stream and a first thickened material stream. The separation may be carried out in a settling or sludge concentrator tank, where the first thickened material stream, labeled in the claims as the first particulate material fraction, settles to the bottom while the first water fraction is decanted from the top of the settling tank. The first water fraction may be used for further drilling or drinking. The consistency of the first particulate material fraction may range from about 15% to 35% solids by weight but more likely range in the 20% to about 30% solids.

For vertical drilling, the first step of the process is carried out on the surface near the site of the storage of the excavated material. For horizontal drilling, the first step of the process may be carried out inside the tunnel. The water from separating the source stream may then be recycled for drilling in the tunnel. Also, the thickened material has a lower volume than the source stream which makes transportation to the surface easier.

The composition of the pellets in the first column of flow-through baskets may be selected from the following formulations:

1) About 90% to 100% sodium or potassium anionic acrylate acrylamide copolymer having about 5% to 90% charge and a weight average molecular weight of about 6 million to 18 million; optionally about 1% to 5% soap; and optionally about 5% anionic starch;

2) About 90% to 100% ammonium anionic acrylate acrylamide copolymer having about 5% to 90% charge and a weight average molecular weight of about 6 million to 18 million; optionally about 1% to 5% soap; and optionally about 5% anionic starch;

3) About 90% to 100% cationic acrylamide copolymer having about a 5% to 90% charge and a weight average molecular weight of about 6 million to 18 million; optionally about 1% to 5% soap; and optionally about 5% cationic starch;

4) About 40% to 45% sodium, potassium or calcium salt, 45% to 55% sodium or potassium anionic acrylate acrylamide copolymer having about 5% to 90% charge and a weight average molecular weight of about 6 million to 18 million; about 1% to 5% soap; and optionally about 5% anionic starch; and 5) About 40% to 50% sodium or potassium anionic acrylate acrylamide copolymer having about 60% to about 99% charge and a weight average molecular weight of about 6 million to 18 million, about 40% to 50% of anionic ammonium polyacrylate having about 60% to about 99% charge and a weight average molecular weight of about 6 million to 18 million; about 1% to 5% soap; and optionally about 5% anionic starch.

In another embodiment of the present invention, a second column of flow-through baskets that contain a plurality of pellets stacked on top of each other is placed after the first column such that the effluent from the first column of flow-through baskets passes through the second column before being fed into the sludge concentrator tank.

The composition of the pellets in the second column of flow-through baskets may be selected from the following formulations:

1. About 95% to 100% aluminum chlorohydrate; and optionally about 1% to 5% soap.

2. About 95% to 100% cationic tannin having a weight average molecular weight of about 200 to 300,000; and optionally about 1% to 5% soap.

3. About 95% to 100% anionic tannin having a weight average molecular weight of about 200 to 300,000; and optionally about 1% to 5% soap.

4. About 90% to 100% sodium or potassium anionic acrylate acrylamide copolymer having about a 5% to 90% charge and a weight average molecular weight of about 6 to 18 million; optionally about 1% to 5% soap; and optionally about 5% anionic starch.

The pellets are made by compressing the compositions in powder form using a pressure of about between 40 to 50 tons for about 5 seconds. This may be accomplished in a number of tablet pressing/compression devices currently on the market.

In the second step of the process, the first particulate material fraction is fed into a reactor in which the first particulate material fraction that contains about 70 to 80% water is treated with 1) a demulsifier in dry powder form and 2) a crosslinked acrylamide acrylate copolymer in a dry powder form. The preferred forms of the acrylamide acrylate copolymer are: sodium acrylamide acrylate copolymer, potassium acrylamide acrylate copolymer and ammonium acrylamide acrylate copolymer. The crosslinked acrylamide acrylate copolymer acts as a superabsorbent capable of absorbing and retaining water in amounts that are many times (as much as 5 to 15 times) the weight of the dry polymer. The degree of crosslinking of the superabsorbent polymer ranges from about 100 to 200 acrylate units per crosslink. When the superabsorbent polymer comes in contact with water, it reacts with it and locks onto it creating a substantially solid gel that is intermixed with the particulate materials from drilling. The demulsifier helps with the gel creation and by controlling the gel formation rate of reaction. An alternative to step 1, the first particulate material fraction is treated with aluminum chlorohydrate in dry powder form having a cationic charge that also functions to control the gel creation and its rate of reaction. Generally, the particle size of the dry powder used to treat the first particulate material fraction ranges from 50 to about 200 microns in diameter and has a dryness level of over 90%.

The preferred steps of the reaction are as follows:

1. Feeding the first particulate material fraction into a first side of a cylindrical reactor that is equipped with a plurality of paddles affixed onto upright bases attached to a rotating axis;

2. Treating the first particulate material fraction with a demulsifier or, alternatively, with aluminum chlorohydrate at an amount of 0.05% to about 5% by dry weight of the first particulate material fraction. The treatment comprises sprinkling the demulsifier or aluminum chlorohydrate in dry powder form from the top of the feed side of the reactor onto an incoming first particulate material fraction feed;

3. Treating the first particulate material fraction with an anionic polyacrylamide copolymer in dry powder form having a weight average molecular weight of about 6 million to about 18 million at an amount of 0.05% to about 5% by dry weight of the first particulate material fraction. The preferred forms of the acrylamide acrylate copolymer include sodium acrylamide acrylate copolymer, potassium acrylamide acrylate copolymer and ammonium acrylamide acrylate copolymer. This is accomplished by sprinkling the anionic polyacrylamide copolymer in dry powder form from the top of the first side of the reactor at a point downstream from the demulsifier addition;

4. Mixing the demulsifier or aluminum chlorohydrate and the anionic polyacrylamide copolymer with the incoming first particulate material fraction feed. This is done by turning the rotating axis and the paddles inside the reactor;

5. Reacting the demulsifier or aluminum chlorohydrate and anionic polyacrylamide copolymer with the water content in the first particulate material fraction feed that locks onto the water in the first particulate material fraction causing the first particulate material fraction to turn into a substantially solid mud crust form that settles at the bottom of the reactor; and 6. Simultaneous with steps 1, 2, 3, 4 and 5, grinding the mud crust into a particulate form by the rotating paddles. The ground mud crust is referred to as the second particulate material fraction in FIG. 3. It is noted that the water content of the second particulate material fraction is unchanged at about 70% to about 80%; however, the solids content following the treatment with the demulsifier and the copolymer increases to 70% to about 90% from the original 20 to about 30% as the superabsorbent locks onto the water intermixed with the particulate materials from drilling creating a substantially solidified mass. The solid mass contains material in gel form that gathers at the bottom of the reactor and is broken apart by the rotating paddles as illustrated in FIG. 7.

Generally, it is desirable to have the demulsifier or the aluminum chlorohydrate added to the first particulate material fraction feed prior to adding the anionic polyacrylamide copolymer. This is accomplished by adding the anionic polyacrylamide copolymer downstream relative to the addition point of the demulsifier or the aluminum chlorohydrate in the reactor. A sifter shown in FIG. 3 helps pinpoint and control the addition location of the two chemical reagents. The preferred positioning of each paddle on its respective is at about 30 degrees rearward in relation to a line of the rotating axis as shown in FIG. 6 by angle β. The preferred demulsifier is tannin; however, other demulsifiers also fall within the scope of the present invention.

Two chemical reagent embodiments may be used for treating the first particulate material fraction in the paddle reactor:

Embodiment 1

A. 0.05% to about 5% by weight of cationic polyacrylamide copolymer that has a weight average molecular weight of about 4 million to about 12 million in dry powder form; and B. about 0.1% to about 5% by weight of demulsifier in dry powder form.

The cationic polyacrylamide copolymer may be either sodium, potassium or ammonium based salt. The preferred demulsifier is cationic tannin.

Embodiment 2

A. 0.05% to about 5% by weight of anionic polyacrylamide copolymer having a weight average molecular weight of 6 to about 18 million in dry powder form and B. about 0.05% to about 5% by weight of demulsifier in dry powder form.

The anionic polyacrylamide copolymer may be either sodium, potassium or ammonium based salt. The preferred demulsifier is anionic tannin.

Below is information about the compositions and properties of the treatment chemicals added in the processes of the present invention:

Tannin

Weight average molecular weight between 10,000 and 300,000
Liquid form with 30 to 40% concentration
Cationic site on the main chain
Viscosity at 50% of between 40 and 2000 centipoises
Comes in various forms such as tannic acid $C_{17}H_{16}O$, and gallic acid $C_7H_6O_5$. May be made having an anionic charge or a cationic charge.

Soap

Sodium or potassium salts of fatty acids that may be made by combining sodium Hydroxide (NaOH) or Potassium Hydroxide (KOH) with an animal fat, vegetable oil, or acetic acid.

Sodium or Potassium Anionic Acrylate Acrylamide Copolymer

This polymer may be made from the reaction between an acrylamide monomer and an acrylic acid monomer as shown below.

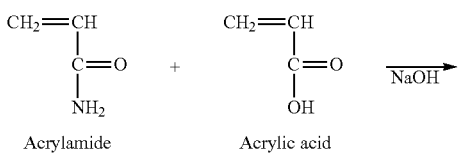

Acrylamide    Acrylic acid

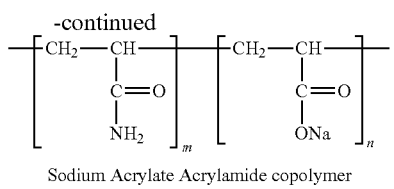

Sodium Acrylate Acrylamide copolymer

Cationic Acrylamide Copolymer

ADMAEA
  Acrylamide-dimethylaminoethyl acrylate copolymers.
  The copolymerization of DMAEA-MeCl with acrylamide produces the cationic polymer.
  The main characteristics of the products obtained are:
    Weight average molecular weight: about 3 million to about 10 million.
  Viscosity at 5 g/l: 100 to 1700 cps.
  Specifically: acrylamide/Ethanaminium, N, N, N-trimethyl-2-((1-oxo-2-propenyl)oxo)-, chloride copolymer is a useful form of ADMAEA in the present invention. The molecular formula is $C_{11}H_{21}ClN_2O_3$. The molecular structure is shown below in 2D.

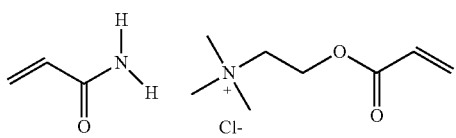

Cationic Acrylamide Copolymers

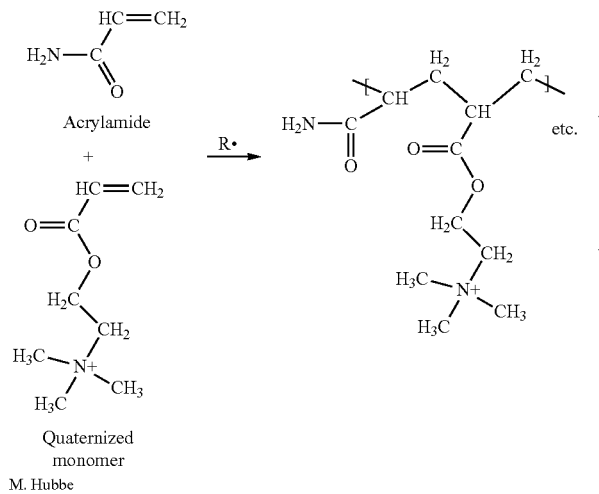

Quaternized monomer
M. Hubbe

In the process of forming trenches and tunnels, bentonite slurry is temporarily used as filler that is later replaced with concrete for wall reinforcement. The replaced bentonite has solids in the range of about 50-70%. This bentonite is in a form that is difficult to separate and transport. To render this bentonite into a more manageable form, water is added to dilute the solids to about 15 to 35%, then the diluted bentonite is chemically treated as follows in a two-stage process prior to the paddle reactor:
  I) 0.1% to 5% by weight of Aluminum Chloralhydrate or tannin from a solution of 1 to 50% solids, then
  II) 0.1% to 5% by weight of anionic polyacrylamide copolymer having a charge of about 30 to 100% and a weight average molecular weight of about 8 to 18 million, or
  0.1% to 5% by weight of cationic polyacrylamide copolymer having a charge of about 5% to 100% and a weight average molecular weight of about 4 to 12 million, depending on the slurry material.

It should be understood, of course, that the foregoing relates to exemplary embodiments of the invention and that modifications may be made without departing from the spirit and scope of the invention.

We claim:

1. A process for removing water from a mixture of water and particulate material, said process comprising:
  providing a source stream containing a mixture of water and particulate material having a solids content of 5% to about 15%;
  a first step of treating said source stream with a first chemical reagent composition, said first step comprising diffusing said first chemical reagent composition into the source stream, said treating resulting in separating said source stream treated with the first chemical reagent composition into a first particulate material fraction and a first water fraction, the first particulate material fraction containing 70% to about 80% water;
  a second step of transforming the first particulate material fraction from a liquid form into a solid block form; and
  a third step of transforming the solid block into granular form wherein the second step and third step of transforming the first particulate material fraction from a liquid form into a solid block form and then into granular form comprise:
  A. feeding the first particulate material fraction into a first side of a cylindrical reactor that is equipped with a plurality of paddles affixed onto upright bases attached to a rotating axis;
  B. treating the first particulate material fraction with a third chemical reagent at an amount of 0.05% to about 5% by dry weight of the first particulate material fraction, said treating with the third chemical reagent being accomplished by sprinkling the third chemical reagent in dry powder form from a top of the first side of the reactor onto an incoming first particulate material fraction feed, said third chemical reagent being selected from the group consisting of a demulsifier and aluminum chlorohydrate;
  C. treating the first particulate material fraction with a superabsorbent acrylate acrylamide copolymer having a weight average molecular weight of about 4 million to about 18 million at an amount of 0.05% to about 5% by dry weight of the first particulate material fraction, wherein treating with the superabsorbent acrylate acrylamide copolymer is accomplished by sprinkling the superabsorbent acrylate acrylamide copolymer in dry powder form from a top of the first side of the reactor at a point downstream from a third chemical reagent addition point;
  D. mixing the third chemical reagent and the superabsorbent acrylate acrylamide copolymer with the incoming first particulate material fraction feed, said mixing being accomplished by turning the rotating axis and the paddles inside the reactor;
  E. reacting the third chemical reagent and the superabsorbent acrylate acrylamide copolymer with a water content in the first particulate material fraction feed, said reacting locking the water contained in the first particulate material fraction, said reacting causing the first particulate material fraction to turn into a solid mud crust form that settles at the bottom of the reactor; and F. simultaneous with steps D and E, grinding the mud crust into a particulate form by the rotating paddles.

2. The process of claim 1, wherein diffusing the first chemical reagent into the source stream is accomplished by bringing the source stream in contact with a plurality of solid pellets containing the first chemical reagent composition, the solid pellets being stacked in a first flow-through basket.

3. The process of claim 2, wherein the plurality of pellets are stacked in such a manner as to provide spaces between said pellets through which the source stream flows to come in contact with outer surfaces of the pellets.

4. The process of claim 1, wherein separating the source stream into a first particulate material fraction and a first water fraction is accomplished in a sludge concentrator tank, said first water fraction being decanted from a top of the sludge concentrator tank, said first particulate material fraction being removed from a bottom of the sludge concentrator tank.

5. The process of claim 1, wherein the first chemical reagent composition is selected from the group consisting of: 1) about 90% to 100% sodium or potassium anionic acrylate acrylamide copolymer having about 5% to 90% charge and a weight average molecular weight of about 6 million to 18 million; optionally about 1% to 5% soap; and optionally about 5% anionic starch, 2) about 90% to 100% cationic acrylamide copolymer having about 5% to 90% charge and about a weight average molecular weight of 6 million to about 18 million; optionally about 1% to 5% soap; and optionally about 5% cationic starch, 3) about 40% to 45% potassium, sodium or calcium salt, about 45% to 55% sodium or potassium anionic acrylate acrylamide copolymer having about 5% to 90% charge and a weight average molecular weight of about 6 million to 18 million; about 1% to 5% soap; and optionally about 5% anionic starch and 4) about 40% to 50% sodium or potassium anionic acrylate acrylamide copolymer having about 60% to 99% charge and a weight average molecular weight of about 6 million to 18 million, about 40% to 50% of anionic ammonium polyacrylate having about 60% to 99% charge and a weight average molecular weight of about 6 million to 18 million; about 1% to 5% soap; and optionally about 5% anionic starch.

6. The process of claim 1, wherein the first step further comprises passing the source stream exiting the first flow-through basket through a second flow-through basket containing stacked solid pellets prior to the second step, the solid pellets being stacked in the second flow-through basket containing a second chemical reagent composition, the second chemical reagent composition diffusing into the source stream passing through the second flow-through basket.

7. The process of claim 1, wherein the first chemical reagent composition is made into solid pellets by applying a pressure of 40 to about 50 tons for about 5 seconds.

8. The process of claim 6, wherein the second chemical reagent composition is made into solid pellets by applying a pressure of 40 to about 50 tons for about 5 seconds.

9. The process of claim 1 further comprising removing the ground particulate mud crust from the reactor and transporting it for disposal.

10. The process of claim 1, wherein the demulsifier is selected from the group consisting of anionic tannin and cationic tannin.

11. The process of claim 1, wherein the superabsorbent acrylate acrylamide copolymer is selected from the group consisting of cationic sodium acrylate acrylamide copolymer, cationic potassium acrylate acrylamide copolymer, cationic ammonium acrylate acrylamide copolymer, anionic sodium acrylate acrylamide copolymer, anionic ammonium acrylate acrylamide copolymer and anionic potassium acrylate acrylamide copolymer.

12. The process of claim 1, wherein the paddles disposed on the base are turned at about 30 degrees rearward in relation to a line of the rotating axis.

13. The process of claim 1, further comprising a pretreatment step of the first particulate material fraction, said pretreatment step comprising a first stage of adding about 0.1% to 5% by weight of aluminum chloralhydrate to the first particulate material fraction and a second stage of adding about 0.1% to 5% by weight of anionic polyacrylamide copolymer having about 30% to 100% charge and having a weight average molecular weight of about 8 million to 18 million.

14. The process of claim 1, further comprising a pretreatment step of the first particulate material fraction, said pretreatment step comprising a first step of adding about 0.1% to 5.0% by weight of tannin and a second stage of adding about 0.1% to 5.0% by weight of cationic polyacrylamide copolymer having about 5% to 100% charge and having a weight average molecular weight of about 4 million to 14 million.

15. The process of claim 1, further comprising a screen disposed prior to the second step for removing particles larger than about 0.05 inches in diameter.

16. The process of claim 15 wherein the screen is a rotating drum screen.

* * * * *